(12) United States Patent
Wang et al.

(10) Patent No.: US 12,130,458 B2
(45) Date of Patent: Oct. 29, 2024

(54) APPARATUS FOR CONDUCTING LIGHT TO A FABRIC SURFACE

(71) Applicants: INTERFOCUS INC., Mountain View, CA (US); SHENZHEN YINGFUSI TECHNOLOGY CO., LTD, Shenzhen (CN)

(72) Inventors: Can Wang, Shenzhen (CN); Xianbo Lai, Shenzhen (CN); Cheng Yao, Shenzhen (CN)

(73) Assignees: Interfocus Inc., Mountain View, CA (US); Shenzhen Yingfusi Technology Co., Ltd, Shenzhen (CN)

( * ) Notice: Subject to any disclaimer, the term of this patent is extended or adjusted under 35 U.S.C. 154(b) by 0 days.

(21) Appl. No.: 18/005,130

(22) PCT Filed: Jul. 14, 2022

(86) PCT No.: PCT/CN2022/105770
§ 371 (c)(1),
(2) Date: Jan. 11, 2023

(87) PCT Pub. No.: WO2024/011517
PCT Pub. Date: Jan. 18, 2024

(65) Prior Publication Data
US 2024/0241302 A1 Jul. 18, 2024

(51) Int. Cl.
*F21V 8/00* (2006.01)
*D03D 15/547* (2021.01)

(52) U.S. Cl.
CPC ......... *G02B 6/0006* (2013.01); *D03D 15/547* (2021.01); *G02B 6/0008* (2013.01); *G02B 6/001* (2013.01); *D10B 2401/18* (2013.01); *D10B 2401/20* (2013.01)

(58) Field of Classification Search
CPC .... G02B 6/0006; G02B 6/0008; G02B 6/001; D03D 15/547; D10B 2401/18; D10B 2401/20
See application file for complete search history.

(56) References Cited

U.S. PATENT DOCUMENTS

| 4,062,116 | A | * | 12/1977 | Arnott | B26D 3/10 30/292 |
| 5,617,497 | A | * | 4/1997 | Kingstone | G02B 6/4415 385/100 |
| 2020/0110210 | A1 | * | 4/2020 | Beauchamp | F21S 43/27 |

(Continued)

FOREIGN PATENT DOCUMENTS

| CN | 1508579 | 6/2004 |
| CN | 101347135 | 1/2009 |

(Continued)

*Primary Examiner* — Donald L Raleigh
(74) *Attorney, Agent, or Firm* — Rimon Law

(57) ABSTRACT

The present invention relates to a light emitting fabric piece with embedded light source. The light emitting fabric piece comprises lights, cables, optical fiber to conduct light and embedded into fabric, and a controller. The light emitting fabric piece can be part of clothing garments, curtains, wall coverings, furniture coverings, or other fabric applications. The present invention also relates to a device for cutting fiber optic fabric to create dense light points in patterns and a method and assembly to prepare an optical fiber bundle.

18 Claims, 7 Drawing Sheets

(56) References Cited

U.S. PATENT DOCUMENTS

2020/0283931 A1   9/2020  Abouraddy et al.
2021/0214872 A1*  7/2021  Wang .................. D05C 7/08

FOREIGN PATENT DOCUMENTS

| CN | 203092622 | 7/2013 |
| CN | 203855744 | 10/2014 |
| CN | 104164734 | 11/2014 |
| CN | 111497392 | 8/2020 |
| CN | 112997035 | 6/2021 |

* cited by examiner

APPARATUS FOR CONDUCTING LIGHT TO A FABRIC SURFACE

CROSS-REFERENCE TO RELATED APPLICATIONS

This application is a United States national stage entry of International Patent Application serial no. PCT/CN2022/105770 filed Jul. 14, 2022, the contents of which are incorporated herein by reference in their entirety.

BACKGROUND

Optical fibers are thin strands of material, typically made of silica or plastic that transmit light. Optical fibers may light up at one end (end emitting fiber), or along the enter strand (side emitting fiber). End emitting fibers are useful for creating an effect of small, bright points of light. Side emitting fibers create a constituent string of light and can be grouped into multiple strands to create an overall glow.

With many different uses, optical fibers have found a way into wearables, more specifically, clothing and other accessories. Fiber optic fabric is fabric embedded with optical fiber and is capable of emitting light. Fiber optic fabric's uses are not limited to wearables. Lighted fabric is also used as curtains, furniture coverings, ceiling decoration, wall coverings, bedding, and other various applications where fabric may be used.

Incorporating a light source into optical fiber is essential for its operation. In fiber optic fabric, incorporating a light source poses specific problems, ranging from bulkiness, safety issues, to illumination effect. Consistent lighting with sharp hues has been desired for aesthetic display of fiber optic fabric. But, the equipment required to achieve such a lighting effect is too bulky and unsafe.

Integrating optical fiber into fabric also requires treatment of the fabric such that fiber optic is visible and emits light at the surface. Dense light points along the optical fiber strand body are also desirable. To treat fiber optic fabric to achieve these effects, current technique uses abrasion, typically with available equipment not specifically designed for fabric treatment, such as using sandpaper to rub the fabric surface. Inconsistent fabric surface is the result of such treatment, giving rise to low quality light emitting fiber optic fabric. Chemical treatment provides another option, which often results in damages to fabric surfaces. Moreover, the quality of such treatment methods is not easy to control.

When optical fiber strands are integrated into fabric, a part of the strands still extend beyond the fabric's body. The extended part of the optical fiber is connected to a light source to receive and transmit light. Forming optical fiber strands into bundles capable of being connected to a light source remains a manual process using a heat-shrinkable tube or tape. Such methods result in unstable optical fiber bundles, making it hard to connect the bundles to light sources.

There exists a demand for safe, light and compact fiber optic fabric assembly with an effective means to treat fabric for fiber optic integration. There also exists a demand for effective, stable bundling of optical fiber strands to connect to light sources. The present invention addresses this and other related needs in the art.

SUMMARY

According to frequently included embodiments, there is provided an apparatus for conducting light to a fabric surface, the apparatus comprising:

a light source configured to emit light;
a light guide physically and operatively connected to the light source;
at least one optical fiber bundle physically and operatively connected to the light source;
a circuit board operatively connected to the light source;
a case to enclose the light source, the light guide, the circuit board and a part of the at least one optical fiber bundle; and
a sleeve positioned on the outside of the case, the sleeve wraps around the case section covering the optical fiber bundle;
wherein the light guide is configured to guide the light emitted by the light source towards the at least one optical fiber bundle,
wherein the light source is connected to the optical fiber bundle at a coupling interface, and
wherein the at least one optical fiber bundle comprises fiber optic strands configured to conduct light from the light source.

Often according to embodiments described herein an apparatus is provided as described herein, wherein the case comprises heat shrinkable plastic.

Frequently according to embodiments described herein an apparatus is provided as described herein, wherein the case comprises crimp-type metal confinement ring.

Often according to embodiments described herein an apparatus is provided as described herein, wherein the case encloses the parts inside in a waterproof manner.

Frequently according to embodiments described herein an apparatus is provided as described herein, wherein the at least one optical fiber bundle is slidably connected to the coupling interface in a snap-fit configuration.

Often according to embodiments described herein an apparatus is provided as described herein, wherein the at least one optical fiber bundle comprises fiber optic strands configured to light up at the end of the fiber optic strands.

Frequently according to embodiments described herein an apparatus is provided as described herein, wherein the at least one optical fiber bundle comprises fiber optic strands configured to light up along the body of the fiber optic strands.

Often according to embodiments described herein an apparatus is provided as described herein, wherein the at least one optical fiber bundle comprises both fiber optic strands configured to light up at the end of the fiber optic strands and fiber optic strands configured to light up along the body of the fiber optic strands.

Frequently according to embodiments described herein an apparatus is provided as described herein, wherein at least part of each of the fiber optic strands are weaved into textile yarn threads to create fiber optic fabric.

Often according to embodiments described herein an apparatus is provided as described herein, further comprising at least one cable configured to connect the apparatus to a power source.

Frequently according to embodiments described herein an apparatus is provided as described herein, further comprising at least one additional cable connecting the apparatus to another similar apparatus.

Often according to embodiments described herein an apparatus is provided as described herein, further comprising a controller configured to control the lighting of the optic fiber bundle, the controller configured to connect the at least one cable.

Frequently according to embodiments described herein an apparatus is provided as described herein, wherein the controller comprises a circuit board, a microcontroller unit, an on/off button, at least one port, and a case to enclose the above components.

Often according to embodiments described herein an apparatus is provided as described herein, further comprising a battery.

Frequently according to embodiments described herein an apparatus is provided as described herein, wherein the battery is a onetime use, replaceable battery.

Often according to embodiments described herein an apparatus is provided as described herein, wherein the battery is a rechargeable battery.

Frequently according to embodiments described herein an apparatus is provided as described herein, wherein the controller is configured to supply up to 700 milliAmp per hour of current.

Often according to embodiments described herein an apparatus is provided as described herein, wherein the controller is configured to automatically power off when not connected to a cable.

Frequently according to embodiments described herein an apparatus is provided as described herein, wherein the at least one port is configured to operatively connected to an electrical power cable.

Often according to embodiments described herein an apparatus is provided as described herein, wherein the at least one port is configured to operatively connected to a charging cable.

Frequently according to embodiments described herein an apparatus is provided as described herein, wherein there is only one port and the only one port is configured to operatively connected to a charging cable as well as an electrical power cable.

Often according to embodiments described herein an apparatus is provided as described herein, wherein the at least one port is a single multi-function universal Type C charging port.

Frequently according to embodiments described herein an apparatus is provided as described herein, wherein the at least one port is adapted to operatively connect with a universal 5 Volt charging cable to charge the controller.

Often according to embodiments described herein an apparatus is provided as described herein, wherein the fiber optic fabric comprises a part of a clothing garment.

Frequently according to embodiments described herein an apparatus is provided as described herein, wherein the fiber optic fabric comprises a part of a curtain.

Often according to embodiments described herein an apparatus is provided as described herein, wherein the fiber optic fabric comprises a part of a wall covering.

Frequently according to embodiments described herein an apparatus is provided as described herein, wherein the fiber optic fabric comprises a part of a furniture covering.

Often according to embodiments described herein an apparatus is provided as described herein, wherein the fiber optic fabric comprises a part of a vehicle interior covering.

According to frequently included embodiments, there is provided a method to make a lighted clothing garment, the method comprising:
 providing an apparatus according to relevant claims as above;
 combine the apparatus with other fabric, textile, cloth, or other material suitable for garment production; and
 tailor the combination to produce a garment.

According to frequently provided embodiments, there is provided a device for treating fabric, comprising:
 a handle having a hollow structure at one end forming a socket;
 at least one bearing configured to fit into the socket;
 a plurality of blades, each blade having sharp edges and pointy extensions distributed around the rim of the blade, each of the plurality of blades has a circular bore bearing through the thickness of the blade;
 a plurality of blade sleeves, each of the plurality of blade sleeves has a circular bore bearing through the thickness of the blade sleeve; and
 an axle dimensioned to insert through the center of the plurality of blades and the plurality of blade sleeves at the bores, the axle having bores with threads at each end to receive bolts;
 wherein each of the plurality of blade sleeves are placed in between two adjacent blades,
 wherein the circular bore on the each of the plurality of blades and the circular bore on each of the plurality of sleeves are of the same dimensions, and
 wherein the plurality of blades are configured to be able to rotate around the axle.

Often according to embodiments described herein an apparatus is provided as described herein, further comprising a snap ring positioned between the at least one bearing and the blade closest to the bearing.

Frequently according to embodiments described herein an apparatus is provided as described herein, further comprising a spacer positioned between the bolt and the handle.

Often according to embodiments described herein an apparatus is provided as described herein, wherein the plurality of blades and the plurality of sleeves are substantially circular.

Frequently according to embodiments described herein an apparatus is provided as described herein, wherein the pointy extensions on each of the plurality of blades are situated symmetrically around the circular edge of the blade.

Often according to embodiments described herein an apparatus is provided as described herein, wherein the handle is dimensioned for grasping by a human hand.

Frequently according to embodiments described herein an apparatus is provided as described herein, further comprising an aperture at the end of the handle without the head.

Often according to embodiments described herein an apparatus is provided as described herein, wherein the aperture is configured for hanging of the device in storage.

According to frequently included embodiments, there is provided a method to prepare lighted pattern on a fiber optic fabric, the method comprising:
 providing a device according to any of the above applicable claims;
 providing a piece of fiber optic fabric;
 placing the blades of the device onto the surface of the fiber optic fabric; and
 grasping the handle and pushing the handle such that the blades roll on the fabric.

According to frequently included embodiments, there is provided a method to prepare an optical fiber bundle, the method comprising:
 providing a plurality of optical fiber strands;
 collecting the plurality of optical fiber strands at one end and holding them to form a bundle head;
 wrapping the bundle head with collecting tape;
 cutting and discarding the remnants of the bundle head; and
 adding a fastening sleeve outside the collecting tape.

Often according to embodiments described herein a method is provided as described herein, wherein the plurality of optical fiber strands extend from a fabric piece, the plurality of the optical fiber strands forming part of the fabric piece.

Frequently according to embodiments described herein a method is provided as described herein, wherein the collecting tape comprises plastic.

Often according to embodiments described herein a method is provided as described herein, wherein the fastening sleeve comprises copper.

Frequently according to embodiments described herein a method is provided as described herein, wherein the collecting and holding of the optical fiber strands are performed by an automatic bundle winding machine.

Often according to embodiments described herein a method is provided as described herein, wherein wrapping the bundle head with a collecting tape is performed by an automatic tape winder.

Frequently according to embodiments described herein a method is provided as described herein, wherein cutting and discarding the remnants of the bundle head is performed by an automatic fiber bundle remnant removal device.

Often according to embodiments described herein a method is provided as described herein, wherein adding a fastening sleeve outside the collecting tape is performed by an automatic banding machine.

According to frequently included embodiments, there is provided a manufacturing assembly to produce optical fiber bundles, comprising:
 an automatic bundle winding machine configured to collect and wind a plurality of fiber strands to form a bundle;
 an automatic tape winder configured to wrap tape around the bundle;
 an automatic fiber bundle remnant removal device configured to remove and discard part of fiber strands; and
 an automatic banding machine configured to add a sleeve outside the tape wrapped around the bundle.

These and other embodiments, features, and advantages will become apparent to those skilled in the art when taken with reference to the following more detailed description of various exemplary embodiments of the present disclosure in conjunction with the accompanying drawings.

ABBREVIATIONS

LED: Light Emitting Diode
PCB: Printed Circuit Board

BRIEF DESCRIPTION OF THE DRAWINGS

The skilled person in the art will understand that the drawings, described below, are for illustration purposes only.

DETAILED DESCRIPTION

Figure 1:
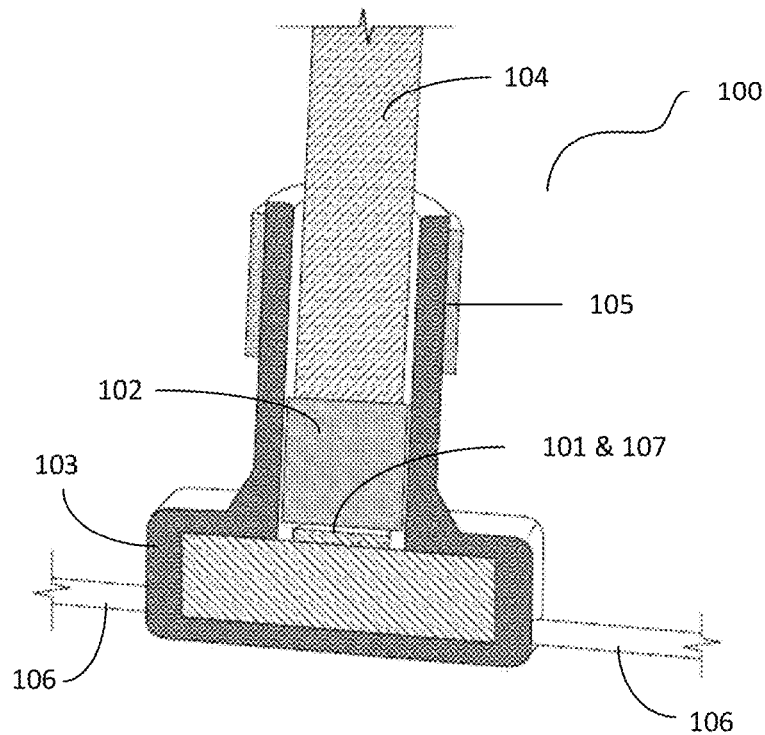
FIG. 1 depicts the cross-sectional view of a light emitting assembly for conducting light to a fabric surface using an optical fiber bundle.

For clarity of disclosure, and not by way of limitation, the detailed description of the invention is divided into the subsections that follow.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in the patents, applications, published applications and other publications that are herein incorporated by reference, the definition set forth in this section prevails over the definition that is incorporated herein by reference.

As used herein, "a" or "an" means "at least one" or "one or more."

As used herein, the term "and/or" may mean "and," it may mean "or," it may mean "exclusive-or," it may mean "one," it may mean "some, but not all," it may mean "neither," and/or it may mean "both."

As used herein, "fiber optic fabric" refers to textile or fabric embedded with optical fiber strands.

In frequent embodiments, the present disclosure provides an apparatus in the nature of a fabric article adapted to light up and change in lighted colors. The apparatus comprises, for example, light emitting assemblies, cables, a controller, and fiber optic fabric.

In often included embodiments, the apparatus comprises a light emitting assembly 100 capable of conducting light from a light source 101 using optical fiber onto a fabric surface. Optical fiber is a flexible, transparent fiber often made by drawing glass (silica) or formed of plastic capable of conducting light. Often included light emitting assemblies according to the present disclosure generally include a light source 101 to generate light and conduct the light via optical fiber bundles to a fabric surface. The fabric surface is often embedded with one or more optical fiber strands. The light emitting assembly 100 is often powered and/or controlled via a controller. In frequent embodiments, the light emitting assembly 100 conducts light using optical fibers grouped together into a bundle to achieve illumination of a fabric surface.

In certain embodiments, the light emitting assembly 100 includes a light source 101 adapted to emit light. The light source 101 may be, for example, a light-emitting diode (LED), adapted to emit light in different colors. Exemplary colors include colors such as yellow, red, blue, and green. Other colors including different shades of colors and color blends are also contemplated. Other light sources 101 may be suitable for use in presently described apparatus and assemblies. The light source 101 may be coupled with electrical circuits present on a printed circuit board (PCB) for control of the light source, such as turning/off or switching mode. The PCB 107 may be configured to turn different lights present within the light source 101 and/or to turn the various lights on/off to simulate light patterns or movement. Various built-in operation programs may be made available, and users can choose between them by pressing on the button 206, which is configured to shift operation between various modes.

In frequently included embodiments, the light emitting assembly 100 according to the present disclosure includes cables to connect the PCB 107 to a power source, for example, a battery 203 or another electrical power source. The cable 106 may be connected to a power source directly or connected in a chain through other light emitting assemblies and other PCBs 107 in a series connection. Alternatively, the power source, light emitting assemblies, and PCBs 107 may be connected to each other in a parallel connection.

FIG. 1 illustrates an exemplary light emitting assembly 100 according to certain embodiments described herein. The light emitting assembly 100 may comprise an optical fiber bundle 104 capable of conducting light generated by a light source 101. The optical fiber bundle 104 extends from the light emitting assembly 100 and each strand is weaved into a yarn to form a fabric piece. The yarn with fiber optic strands weaved in therefore creates fiber optic fabric 108 and is capable of lighting.

Each optical fiber bundle 104 is connected a light source 101 in the apparatus. In particular, the LED lights and PCB 107 may be located at the base of the apparatus and connected to cables at both sides. One side of the cable 106 may be connected to a power source while the other side may be connected to a different apparatus. Alternatively, both sides of the cable 106 may be connected to different apparatuses. The LED lights and PCB 107 may each act as a resistor and may be connected in series or in parallel.

In FIG. 1, the light source 101, which may comprise LED lights, is depicted at the bottom of the optical fiber bundle 104 and acts as the light source 101 to light the optical fiber bundle 104. Exemplary light sources include other lighting means, such as lamps. Tungsten halogen lamps, metal-halide lamps, compact metal-halide lamps, multifaceted reflector lamps, such as MR16 lamps, are other options to act as a light source in the apparatus according to embodiments of this disclosure. Different brightness levels may require different light sources, but wearable fiber optic fabric 108 suitable for human clothing and accessories usually uses LED lights powered by a rechargeable battery 203 or a mobile power supply. In particular, wearable fiber optic fabric 108 often uses 0.6-1.5-Watt chip LED lights. A 3.7V rechargeable battery 203 and/or 5V mobile power supply, for example, may be used as a power source for such LED lights. These LED light specifications are also suitable for other fiber optic fabric 108 applications, such as wall coverings, curtains, furniture coverings, stage decorations, vehicle interior decorations, among other uses. Other specifications for light and light wattage in the light emitting assembly 100 are contemplated.

Light sources and the PCB 107 may be integrated into a panel, or a block covered by or comprised in a housing. Light sources may be functionally coupled and electrically connected to the PCB 107. The PCB 107 may be configured to control the light source, including turning the lights on/off, controlling the brightness, or coordinate the light on/off pattern to achieve different visual effects on the fiber optic fabric 108.

Figure 2:
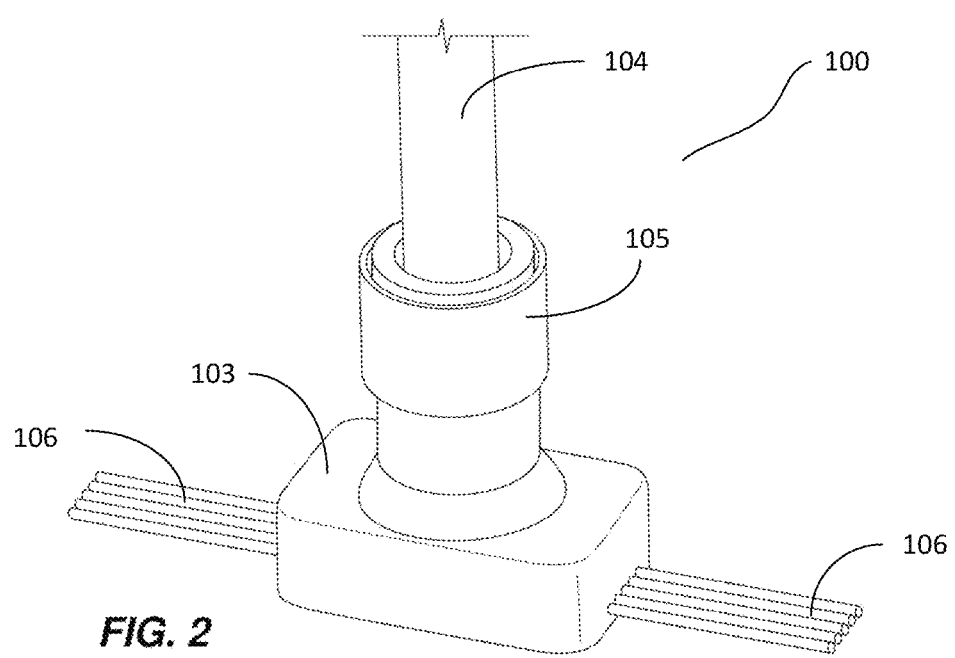
FIG. 2 is a perspective view of the light emitting assembly in FIG. 1.
Figure 3:
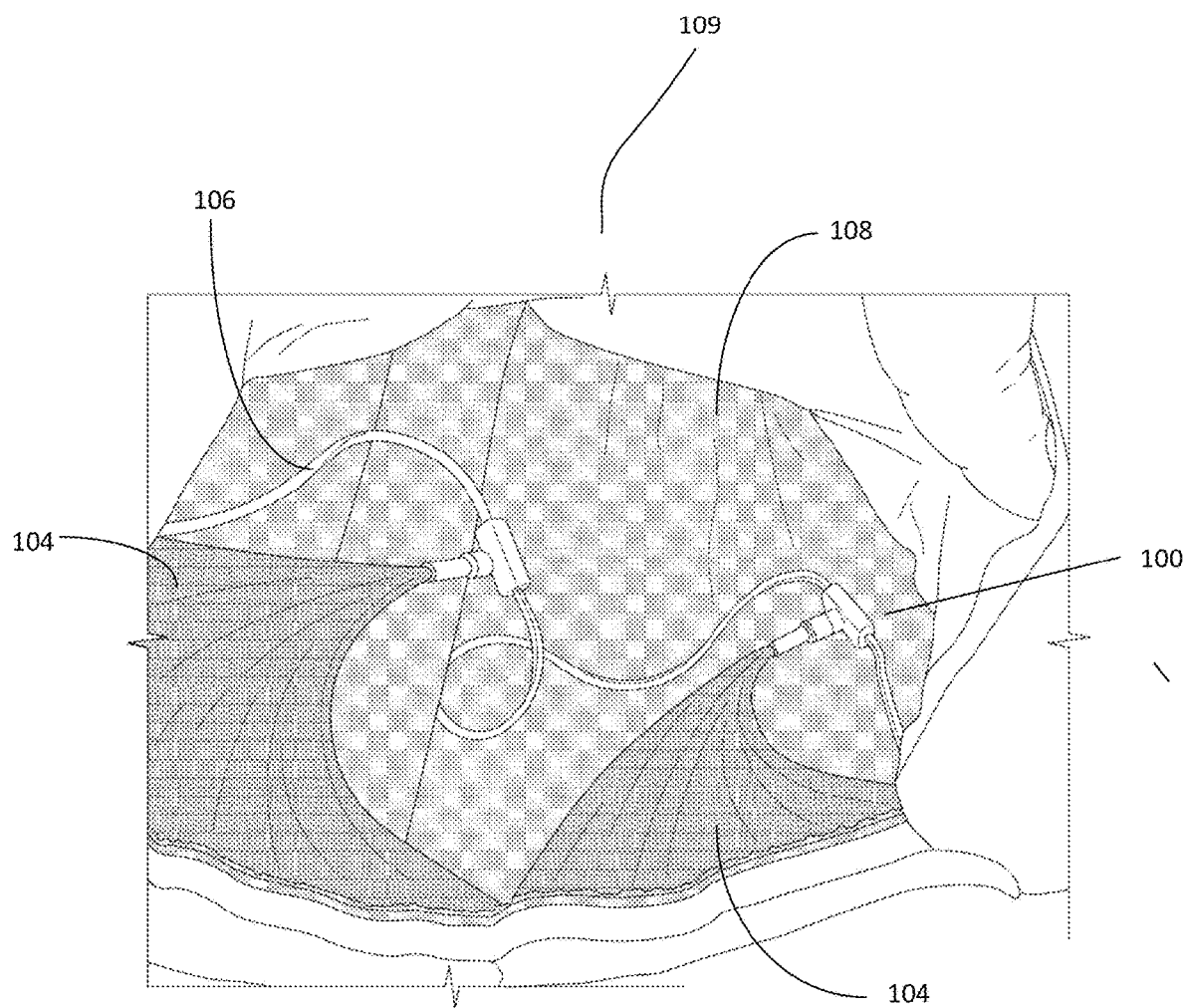
FIG. 3 depicts a piece of fiber optic fabric connected to two light emitting assemblies via optical fiber bundles.

The light source and PCB 107 may be electrically connected to a power source via cables. In FIGS. 2 and 3, cables may be seen on both sides of the case 103, within which the light source and PCB 107 resides. The cables as shown in FIGS. 1, 2, and 3 may connect to a power source or another apparatus of similar configuration.

Above the light source may be a light guide 102, which guides the light from the light source to the bottom of the optical fiber bundle 104, thereby providing better light conduction. The light guide 102 also prevents light from refracting elsewhere and not reaching or not transmitted along the optical fiber bundle 104. Different light colors also mix more evenly within the space defined by the light guide 102. Finally, the light guide 102 may be adapted to act as an adapter, with a configured fitting (e.g., pipe-like) adapted to removably or permanently integrate with the light source on one end and the optical fiber bundle 104 on the other end. The light guide 102 may be transparent or translucent.

An optical fiber bundle 104 may be connected to the light guide 102 opposite and in light communication connection with the light source. An optical fiber bundle 104 comprises two or more optical fiber strands capable of conducting light. Optical fiber strands as used herein may conduct light to their ends and/or along their lengths, such that the light may be seen either at the end of the optical fiber optic and/or along its length. When integrated into textile fabric, optical fiber type may be chosen to fit with the need for lighting, light patterns, or visual effects on the garment or cloth.

The light source, the PCB 107, light guide 102, the optical fiber bundle 104 and the cable 106 are often joined together into a single unit (e.g., one piece) by an injection molding process, with the light source connected to the cables placed inside a plastic case 103 acting as the housing. This housing is often adapted to be soft, which provides more comfort for users, especially in lighted clothing application. The resulting product is often encased in a waterproof housing, thereby increasing safety during wear and operation due to the presence of electrical voltage or potential. For case of use, a sleeve 105 may be present outside the case 103 along the length of the bottom part of the optical fiber bundle 104. The sleeve 105 may serve to, for example, enable easy grasping during installation and/or maintenance of the light emitting assembly 100 or for a specific desired lighting effect.

Optical fiber fabric may comprise fiber optic and other textile yarns, depending on the requirements of the fabric. Textile yarns may be chosen according to the end use, such as clothing, clothing accessories, decorations, upholstery, furniture covering, curtains, or other uses. Optical fiber may be plastic optical fiber, comprising high optical rate core layer and an outer layer. Plastic optical fiber may be combined with textile yarns to create optical fiber fabric. In the present invention, optical fiber is combined with yarn to form fiber optic fabric 108, where strands of optical fiber are weaved into textile yarn to form a piece of fabric embedded with optical fiber. The optical fiber strands from the bundle as shown in FIG. 1 are weaved into textile yarn, creating fiber optic fabric 108. FIG. 3 is an example of how the light emitting assembly 100 is connected to an optical fiber bundle 104 and the optical fiber strands in the optical fiber bundle 104 are weaved into textile yarn to form fiber optic fabric 108.

FIG. 2 depicts a perspective view of the light emitting assembly 100. Cables may be seen extending from the bottom of the case 103 on two directions. A sleeve 105 may wrap around the case 103 at a position corresponding to the bottom of the optical fiber bundle 104. The light emitting assembly 100 is attached to one bundle, with optical fiber extending from the optical fiber bundle 104 and weaved into fiber optic fabric 108.

FIG. 3 depicts a garment 109 comprising light emitting assemblies integrated into fiber optic fabric 108. In FIG. 3, two light emitting assemblies are connected to each other in a continuous connection. From each light emitting assembly 100, an optical fiber bundle 104 may spread out into individual optical fiber strands, each optical fiber strand may be weaved into textile fabric to form fiber optic fabric 108. The light emitting assemblies and fiber optic fabric 108 may be integrated with other components, such as ordinary fabric, to form a light emitting garment 109.

Figure 4:
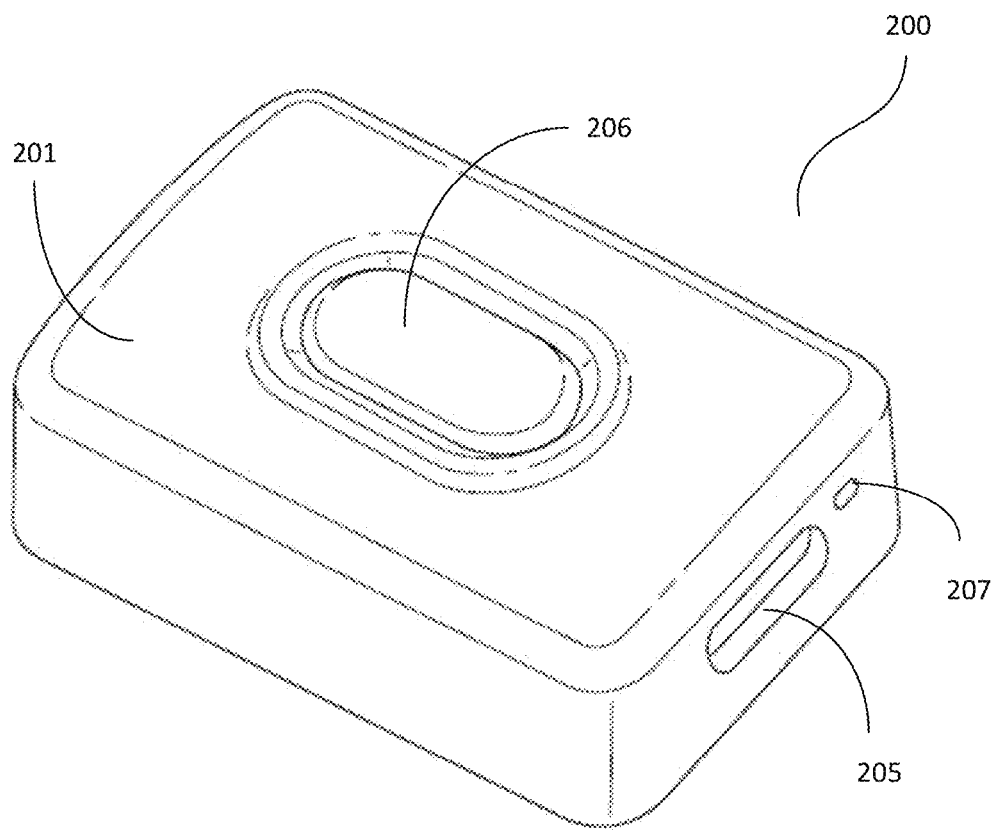
FIG. 4 depicts a controller with an on/off switch.

In embodiments, the light emitting assembly 100 further comprises a controller. FIG. 4 depicts a perspective view of the controller. The controller 200 may be configured to control operation of the light emitting assembly 100. An on/off/toggle/adjustment actuator configured as a button 206 in the depicted embodiment but could take any one of a variety of forms, is often present on the controller 200 for controlling operation of the light emitting assembly 100. The actuator may be configured to turn the power to the light emitting assembly 100 on or off. The actuator may also be configured to switch between light source operation modes, such as switching between brightness levels, different lights, different light colors, different patterns, or flashing modes. An indicator LED light 207 may be present to indicate that the controller 200 is in operation.

Figure 5:
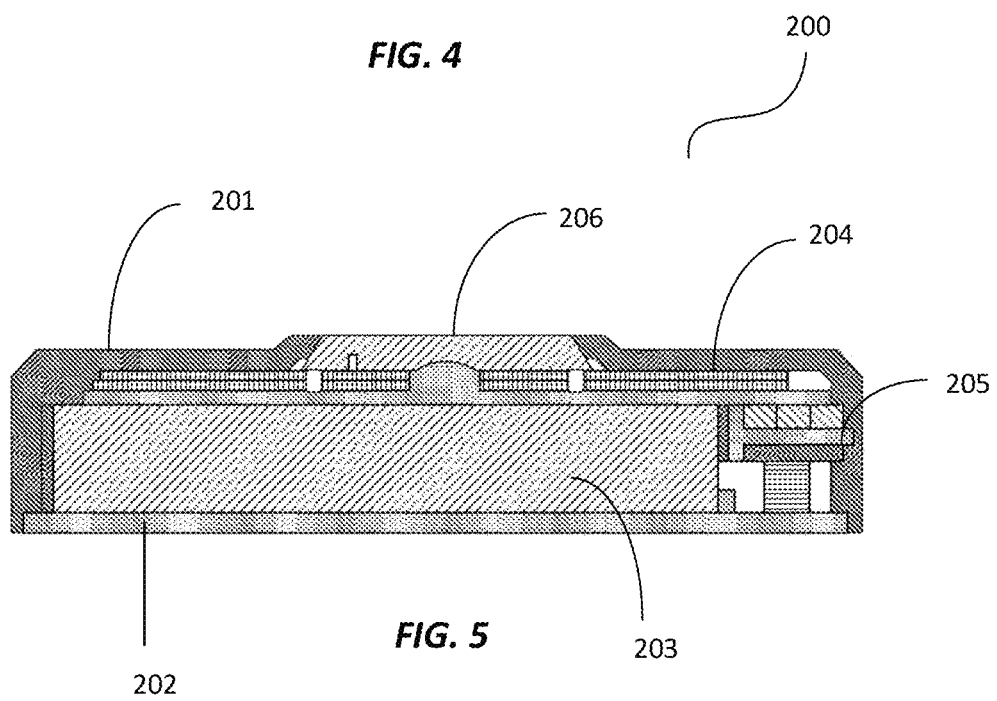
FIG. 5 is the cross-sectional view of the controller in FIG. 4.

FIG. 5 depicts the cross-sectional view of the controller 200. The controller 200 is encased in a case, which comprises a top case 201 and a bottom case 202. Below the actuator may be a printed circuit board, which may be configured to provide operational control of the light emitting assembly 100. The controller 200 may further comprise an interface plug 205, which may be adapted for multi-use, including charging and connecting with a cable 106 to output power and/or to control the light emitting assembly 100. The interface plug 205 may be, for example, a multi-function universal Type C interface, adapted for charging with a universal 5V charging cable 106 and for connection with the light emitting assembly 100 via a cable. Other interfaces and charging mechanisms are contemplated. The controller 200 may be powered by a chargeable battery, which may be charged through the interface plug 205. Alternatively, the battery 203 may be replaceable. Current up to 700 mAh may be supplied by the battery, but higher currents are contemplated. The controller 200 may also be configured to operate by power supplied from an electrical source, such as plugging into a power point. The controller 200 is enclosed in a case 103, the case 103 preferably is made of non-conductive materials such as plastic. The case 103 may also be waterproof.

The controller 200 often further comprises a means for electronic component fixing and to provide for electrical connections such as a PCB 204 configured to control operation of the light emitting assembly 100. The controller PCB 204 may be configured to turn the light emitting assembly 100 on/off, change the brightness of the lights, change the colors of the lights by turning lights of certain colors on and lights of other colors off, flash the lights by turning light on/off in certain patterns. The controller 200 may also be configured to charge the battery 203. Other functions may be configured according to need.

The light sources, which often comprise LEDs of different colors, such as red, green and blue, may be controlled by the controller 200 to emit different lights. For example, LEDs of all three colors above are present on the PCB 107 on the light emitting assembly 100. The controller 200 may be configured to turn LEDs of one color on while keeping the two colors off, thereby emitting lights of one color. The controller 200 may alternatively be configured to turn LEDs of two or three different colors on to achieve a mixed color. For example, turning both red and blue LEDs on will result in violet lights shown on the fiber optic fabric 108. Similarly, turquoise can be achieved by turning blue and green LEDs on at the same time. Other arrangements of light colors may also be made.

The actuator may be configured to be used as a joystick as well as to turn the light assembly on/off. In operation, the controller 200 may be connected to the cable 106 of the light assembly. Upon pressing of the button 206, the lights may turn on and illuminate the fiber optic fabric 108. Pressing the button 206 again may change the light display in colors, brightness, display time. Pressing the button 206 again turns the light assembly off. Alternatively, pressing the button 206 once turns the light assembly on, the light assembly remains in operation according to the configuration in the PCB 107. Then, pressing the button 206 again turns the light assembly off.

The controller 200 may be configured with automatic power-off function. When the interface plug 205 is not connected to a cable, the controller 200 may automatically turn itself off, thereby conserving energy and ensuring safety, such that no electrical power is in operation when the controller 200 is not connected.

As depicted in FIG. 4, the controller 200 has a generally rectangular shape with an oval button 206. Other shapes are contemplated to fit with the design need for use in clothing and/or other fabric uses. The controller 200 is sized to accommodate the necessary components while at the same time maintain a small weight and size to be integrated into the light assembly. Since the light assembly forms a part of the light emitting garment, a small weight and size is more suitable for being placed inside a clothing piece.

Figure 6:
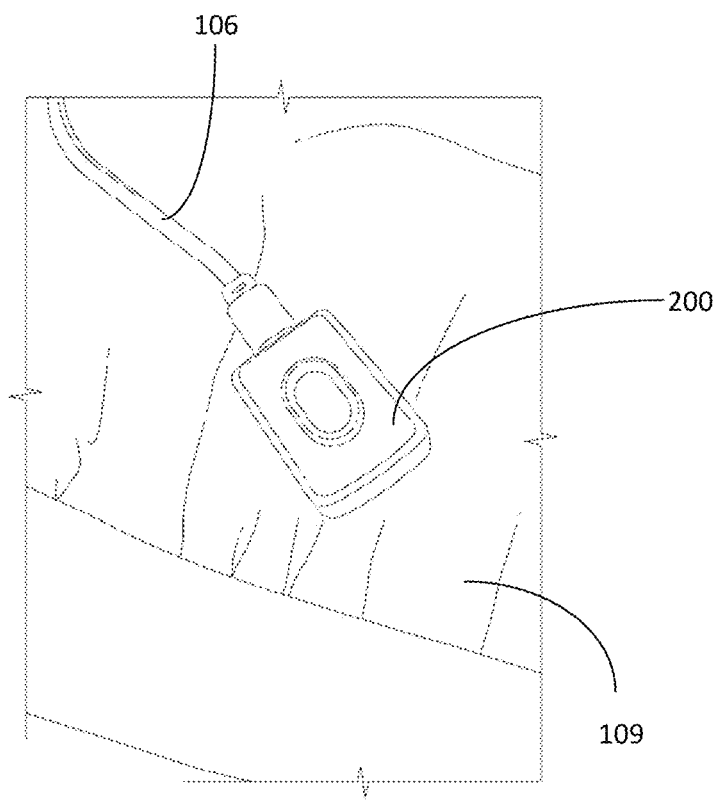
FIG. 6 depicts the controller of FIG. 4 connected to a cable of a light-emitting assembly.
Figure 7:
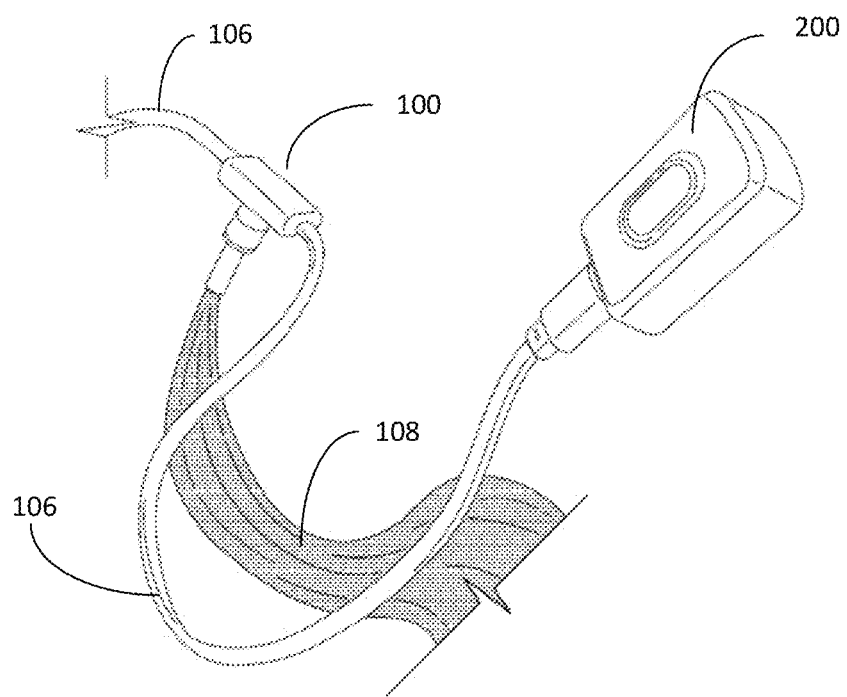
FIG. 7 depicts the controller connected to the light emitting assembly of FIG. 1 via a cable.

FIG. 6 depicts the controller 200 connected to a cable 106 from the light emitting assembly 100. The light emitting assembly 100 as depicted in FIGS. 1, 2, and 3 may have a cable 106 with an end configured to connect to the controller. As depicted herein, the controller 200 often has a universal Type C interface connected to the cable 106 with a corresponding adapter. After connecting to the cable, the controller 200 may be positioned in a pocket on the light emitting garment 109. The pocket as may comprise a patch of cloth sewn onto the non-light emitting fabric part of the light emitting garment 109. On the non-light emitting fabric section may be a small opening. The cable 106 may extend into the pocket through the small opening sized to fit the cable 106 but not the controller. Upon attaching to the cable 106 at the interface plug 205, the controller 200 may rest in the pocket and may be carried around with the light emitting garment 109 in this manner. The pocket may provide a place to securely store the controller 200 while the light emitting garment 109 is worn. A similar arrangement may be present on other fiber optic fabric 108 pieces used for other purposes.

In certain embodiments, there is provided a light emitting garment 109. The light emitting garment 109 may comprise the light emitting assembly 100 operatively connected and physically integrated into light emitting fabric. A layer of non-light emitting fabric may be present and situated side-by-side with the light emitting fabric to provide protection from physical contact and environmental factors during use. Moreover, a layer of non-light emitting fabric may also be included to provide a barrier between the light emitting assembly 100 and the wearer of the light emitting garment 109, thereby protecting the wearer from discomfort caused by rubbing against the electrical components of the light emitting garment 109. An additional non-light emitting layer covering the other side of the light emitting fabric may also be present. This can be seen in FIG. 3, where an additional, decorative layer is added for a dual purpose of providing additional aesthetic appeal and protection for the light emitting fabric layer. The decorative layer may be at least partially transparent such that light transmitted through fiber optic strands and shown on the fiber optic fabric surface may be seen.

In often included embodiments, the light emitting assembly 100 is integrated into light emitting fabric, which forms a part of a light emitting garment 109, where the light emitting fabric is shaped and/or contoured onto a non-light emitting fabric piece to form a pattern. Upon activation of the light emitting assembly 100, light is transmitted along the fiber optic strands to the light emitting fabric and forms light displays such as decorative patterns, which may be various shapes, animals, text, flowers, or other appearances and meanings. Various colors may be present, and the light may change in colors, turn on/off to alter the appearance of the light display.

The light emitting assembly 100 may be integrated into other fabric materials for other uses, apart from garment and clothing. Other applications include, but are not limited to, curtains, wall coverings, ceiling decoration, furniture coverings, vehicle interior decorations and coverings, performance art stage decorations, among other applications.

In certain embodiments, fiber optic fabric 108 needs additional treatment to better illuminate when the light emitting assembly 100 is in operation. Fiber optic fabric 108 comprises textile yarn and optical fiber strands weaved into one piece. Optical fiber strands may be obstructed with other textile yarn and thus light cannot be seen adequately. Moreover, dense light points may be desirable, and the surface layer of the optical fiber strand may need to be abrased to achieve this effect. A tool for treatment of fiber optic fabric 108 is necessary to ensure best lighting effect.

In often included embodiments, a fiber optic fabric treatment tool 300 may comprise a plurality of sharp blades 302 arranged on an axle 304, the axle 304 connected to a handle 301. In operation, a user may hold the handle 301 and roll the blades 302 on a fiber optic fabric surface. The blades 302 may pierce through the normal textile yarn to expose the fiber optic strand, thereby allowing lights transmitted through the fiber optic strand to be seen. The blades 302 may also cut the surface of the optical fiber strand, but not cut through the strand completely, to give dense light points at the cut when light is transmitted along the optical fiber strand.

In use of the presently contemplated fiber optic fabrics, the battery 203 203 in the controller 200 may be charged and the controller 200 be connected to the light emitting assembly 100 at the controller 200 interface via the cable. The actuator may be actuated, at which point power from the battery 203 may be transmitted to the light emitting assembly 100 via the cable. Power activates the lights (e.g., LED lights) and the PCB 107 in the light emitting assembly 100 controls operation of the lights as configured. Light emitted from the light source of the light emitting assembly 100 travels through the light guide 102 to the optical fiber bundle 104 and is transmitted along the length of the optical fiber strands to segments of the optical fiber strands integrated into the fiber optic fabric 108. Emitted light is visible on the fiber optic fabric 108 as the PCB 107 in the light emitting assembly 100 controls the light source operation. A user may press the actuator again and a different operation pattern may be activated by the light emitting assembly PCB 107, thereby (for example) changing colors of the light emitted on the fiber optic fabric 108. The actuator may be pressed to switch around the various operational patterns configured into the light emitting assembly 100 and eventually to turn the light emitting assembly 100 off.

An optical fiber is composed of a core layer with high conductivity and a high reflectivity cortex. Typically, the cortex operates to shield light signals within the fiber such that light passing through the fiber is not visible through an intact cortex. When the cortex is damaged, cut, removed or otherwise opened, a portion of the light transmitted along the optical fiber length refracts, reflects and/or escapes from the damaged cut, removed or otherwise opened portion of the cortex. In lighted fabric, cutting through all or part of the cortex of optical fiber strains may give more intense light points at each of the one or more points of the cortex that are opened to permit access to the light signal within the fiber, thereby creating a light effect. When viewed together, multiple points of damaging, cutting, removing or otherwise opening the light fiber creates any of a variety of predetermined lighting effects. The present invention provides a fiber optic fabric treatment tool 300 to achieve this purpose.

Figure 8:
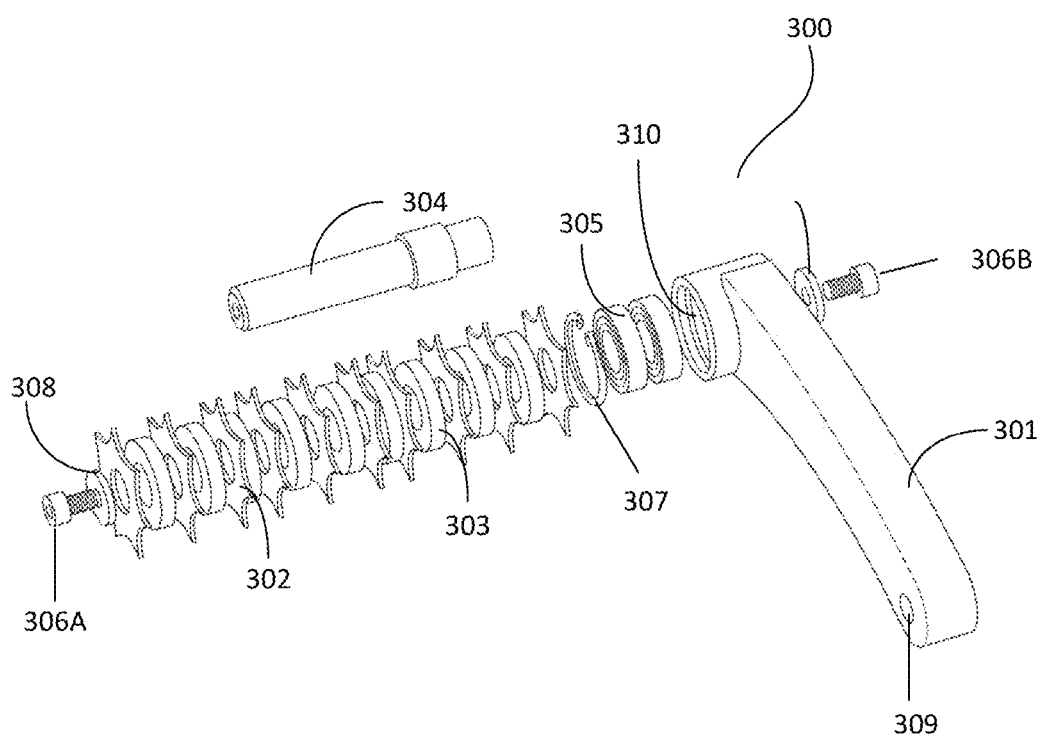
FIG. 8 depicts a tool for treating fiber optic fabric in exploded view.

FIG. 8 depicts the exploded view of fiber optic fabric treatment tool 300. The fiber optic fabric treatment tool 300 comprises a plurality of blades 302 with sharp edges arranged on an axle 304, which is attached to a handle 301. The blades 302 rotate around the axle 304 as the handle 301 is pushed, and the blades 302 cut into a surface on which they roll. The surface may be fiber optic fabric surface and the blades 302 may cut textile yarn and/or optical fiber strands as they roll.

Figure 9:
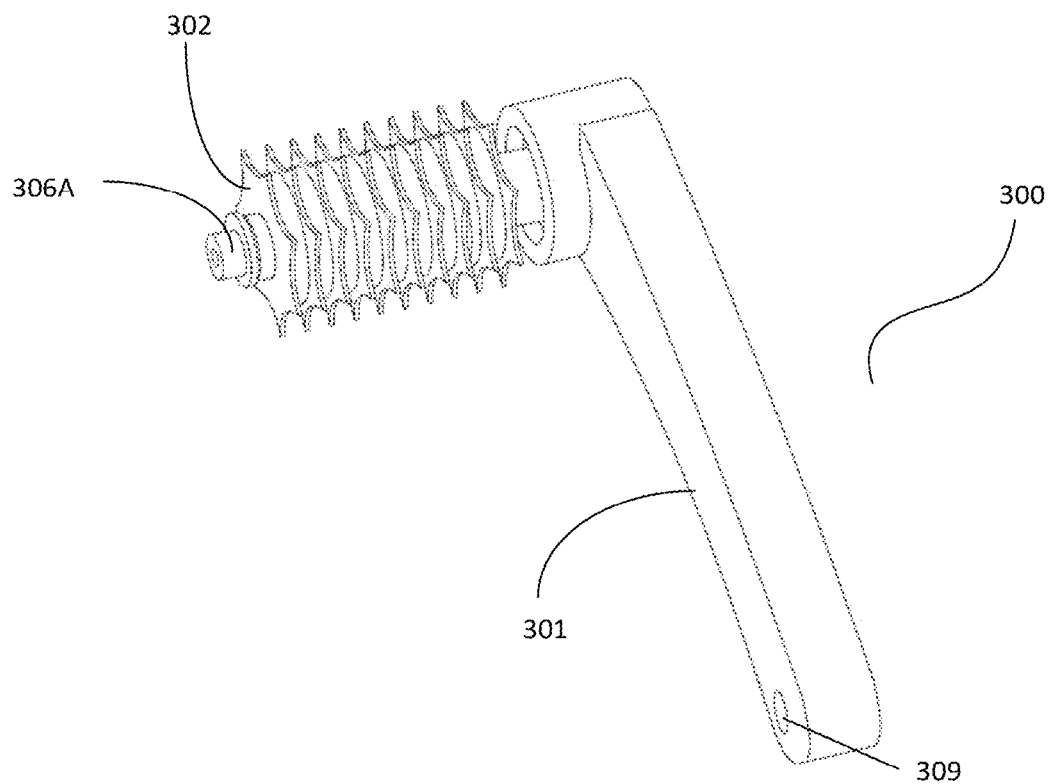
FIG. 9 depicts a perspective view of the device of FIG. 8.
Figure 10:
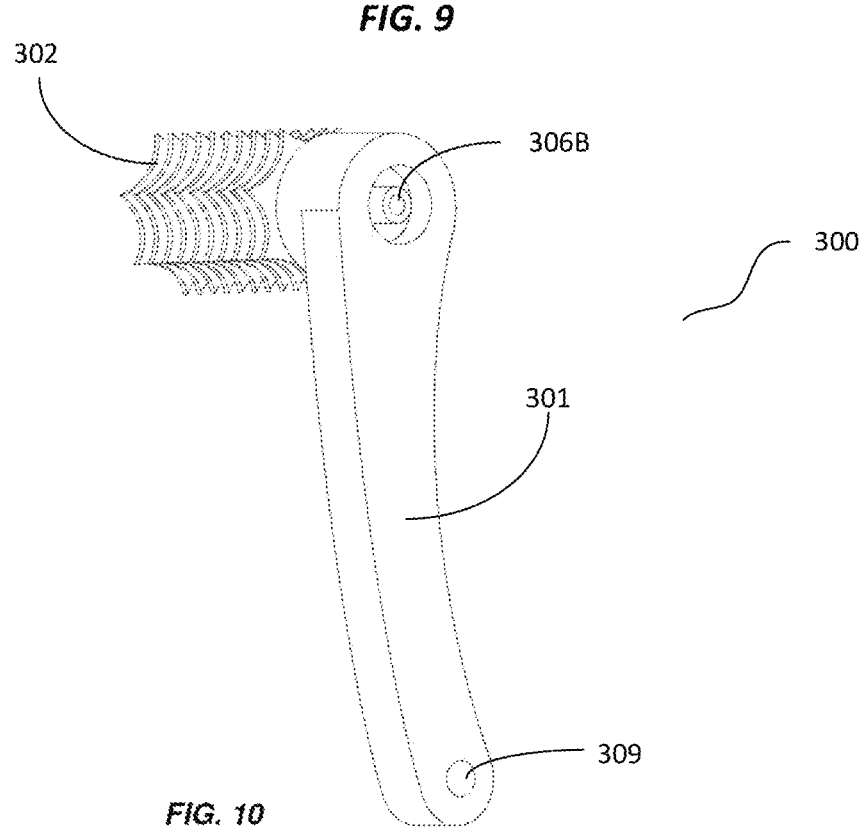
FIG. 10 is a different perspective view of the device of FIG. 8.

The fiber optic fabric treatment tool 300 may comprise a plurality of blades 302. The blades 302 may comprise sharp, pointy extensions designed to cut through a part of textile yarn or optical fiber strand on the fiber optic fabric surface. The amount and/or location of the pointy extensions may be chosen to provide a cutting path shape as desired. The pointy extensions may be situated symmetrically around the blades 302, even though other distribution patterns are contemplated. The blades 302 as depicted in FIGS. 8, 9, and 10 may leave a trailing wake star path on the fiber optic fabric surface when the fiber optic fabric treatment tool 300 is rolled onto a fiber optic fabric surface. Other arrangements of the blades 302 and/or the pointy edges may provide different cutting path shapes, which may be chosen as needed. The shape of each blade is often adapted to provide different cutting path shapes. In certain embodiments, the tool may provide two or more different blade shapes to provide different cutting path shapes simultaneously using the same tool.

The plurality of blades 302 may be arranged on an axle 304 and configured to roll around the axle 304 when force is applied to the axle 304 to move parallelly to a surface. A blade sleeve 303 may be positioned concentrically on the axle 304 such that it moves with the axle 304, and between two adjacent blades 302 in a sandwich-like manner, the blade sleeve 303 provides protection from friction caused by two blades 302 rubbing against each other. The blade sleeves 303 as depicted in FIG. 8 may be sized to have a smaller diameter than the blades 302, such that when the fiber optic fabric treatment tool 300 is rolled on a fiber optic fabric surface, the blade sleeves 303 do not touch the fiber optic fabric surface.

The fiber optic fabric treatment tool 300 may further comprise a handle 301 to which the axle 304 may be attached. As depicted in FIG. 8, the handle 301 may have a socket 310, where the axle 304 may be attached to the handle 301. The socket 310 may be positioned on one end of the handle 301 and is sized and shaped to fit the axle 304, such that the axle 304 may rotate while attached to the handle 301 at the socket 310. The socket 310 may bore through the handle 301, allowing a bolt to be inserted into the axle 304 without contact with the handle 301. Bearings 305 may be provided to insert into the socket 310 and receive the axle 304 and to transmit movement to the axle 304 as force is exerted onto the axle 304 via the handle 301. A snap ring 307 may be present between the blade closest to the bearings 305 and the bearings 305 to secure the connection between the blades 302 and the bearings 305.

The axle 304 as depicted in FIG. 8 may have bolt holes on both ends of the axle 304. On one side is a bolt hole, where a bolt may be inserted to attach the axle 304 to the handle 301. On the other side is another bolt hole where another bolt may be inserted to secure the blades 302 and blade sleeves 303 onto the axle 304. Spacers or gaskets 308 may be used when tightening bolts to reduce friction and provides a better seal.

The handle 301 may be sized to fit a human hand, but the length of the handle 301 may be shorter or longer than what is needed for a human hand to grasp the handle 301. The length of the handle 301 may change the force required to push the fiber optic fabric treatment tool 300 across the fiber optic fabric surface. Optionally, an aperture 309 may be present on the other end of the handle 301, opposite the socket 310, for hanging the fiber optic fabric treatment tool 300 onto a nail on a wall.

FIG. 9 depicts a perspective view of the fiber optic fabric treatment tool 300. When fully assembled, the pointy edges of the blades 302 are aligned as the blades 302 are arranged on the axle 304. The blades 302 and the blade sleeves 303 are placed in an interleaved manner and pressed together. A bolt 306A is inserted and engaged on one side of the axle 304 not connected to the socket 310. The bolt 306A keeps the blades 302 and blade sleeves 303 aligned on the axle 304, such that the blades 302 move together in unison when force is exerted onto the handle 301.

FIG. 10 depicts another perspective view of the fiber optic fabric treatment tool 300. The back of the socket 310 may be seen from this angle, with a bolt 306B attached to the axle 304 inside the socket 310. Point edges on the blades 302 are shown as aligned. As the pointy edges form a star-like shape, the path cut by the blades 302 as they move across the fiber optic fabric surface is in a trailing wake star shape.

In use of the invention, the fiber optic fabric treatment tool 300 may be assembled as described herein. Fiber optic fabric 108 made from textile yarn and fiber optic strands may be provided. A user grasps the handle 301 of the fiber optic fabric treatment tool 300, places the blades 302 in physical contact with the fiber optic fabric surface and pushes the handle 301 to roll the blades 302 on the fiber optic fabric surface. The pointy edges on the blades 302 cut through the skin of the fiber optic strands, leaving a path of cuts through the fiber optic strands in the shape of a trailing wake star. When the light emitting assembly 100 is activated, light transmitted through the fiber optic strands may form a lighted trailing wake star form on the fiber optic fabric surface.

In certain embodiments, the shape and/or spacing of the pointy edges of the blades 302 are adapted to correspond to a shape and/or density of optical fibers in the optical fiber fabric such that the pointy edges penetrate the cortex of the optical fibers in the fabric reliably with a single passage of the blades 302 over the fabric. In certain embodiments, on each passage of the blades 302 over the fabric, at least 20% of the pointy edges of the blades 302 penetrate the cortex of optical fibers in the fabric. Often, at least 30% of the pointy edges of the blades 302 penetrate the cortex of optical fibers in the fabric on each passage over the fabric. Also often, at least 40% of the pointy edges of the blades 302 penetrate the cortex of optical fibers in the fabric on each passage over the fabric. Also often, at least 50% of the pointy edges of the blades 302 penetrate the cortex of optical fibers in the fabric on each passage over the fabric. Also often, at least 60% of the pointy edges of the blades 302 penetrate the cortex of optical fibers in the fabric on each passage over the fabric. Also often, at least 70% of the pointy edges of the blades 302 penetrate the cortex of optical fibers in the fabric on each passage over the fabric. Also often, at least 80% of the pointy edges of the blades 302 penetrate the cortex of optical fibers in the fabric on each passage over the fabric. Also often, at least 90% of the pointy edges of the blades 302 penetrate the cortex of optical fibers in the fabric on each passage over the fabric. Also often, between about 50% to 100% of the pointy edges of the blades 302 penetrate the cortex of optical fibers in the fabric on each passage over the fabric. Also often, between about 75% to 100% of the pointy edges of the blades 302 penetrate the cortex of optical fibers in the fabric on each passage over the fabric. Also often, between about 85% to 100% of the pointy edges of the blades 302 penetrate the cortex of optical fibers in the fabric on each passage over the fabric. Also often, between about 95% to 100% of the pointy edges of the blades 302 penetrate the cortex of optical fibers in the fabric on each passage over the fabric.

In frequent embodiments, fiber optic fabric 108 comprises optical fiber strands weaved into textile yarns. Each optical fiber strand in fabric applications has a part weaved into the fabric and the rest of the strand extends from the fabric to be connected to the light source. This can be seen, for example, in FIG. 3, where optical fiber strands extend beyond the fabric and are joined together to create an optical fiber bundle 104. In fact, the optical fiber bundle 104 in FIG. 3 is formed by the process depicted in FIGS. 11 and 12, with the fiber bundle 402 in FIGS. 11 and 12 being the same with the fiber bundle 104 in FIG. 3. In other applications, optical fiber strands also need to be bundled together to be connected to a light source to transmit light.

Figure 11:
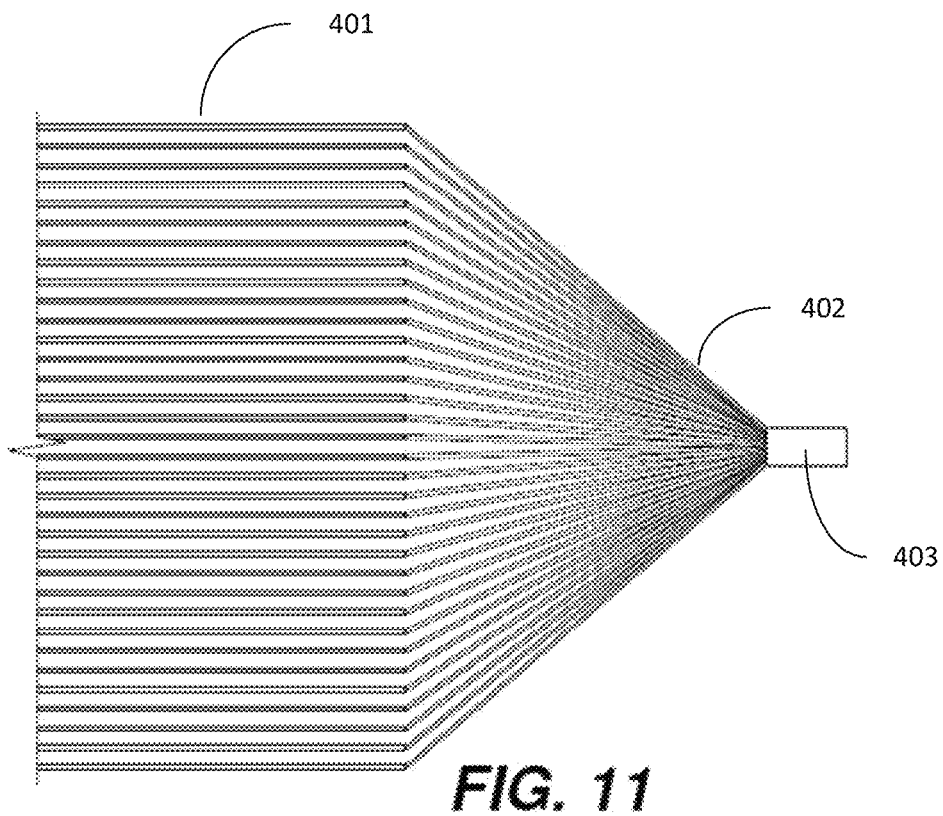
FIG. 11 depicts the process of bundling optical fibers into a bundle.
Figure 12:
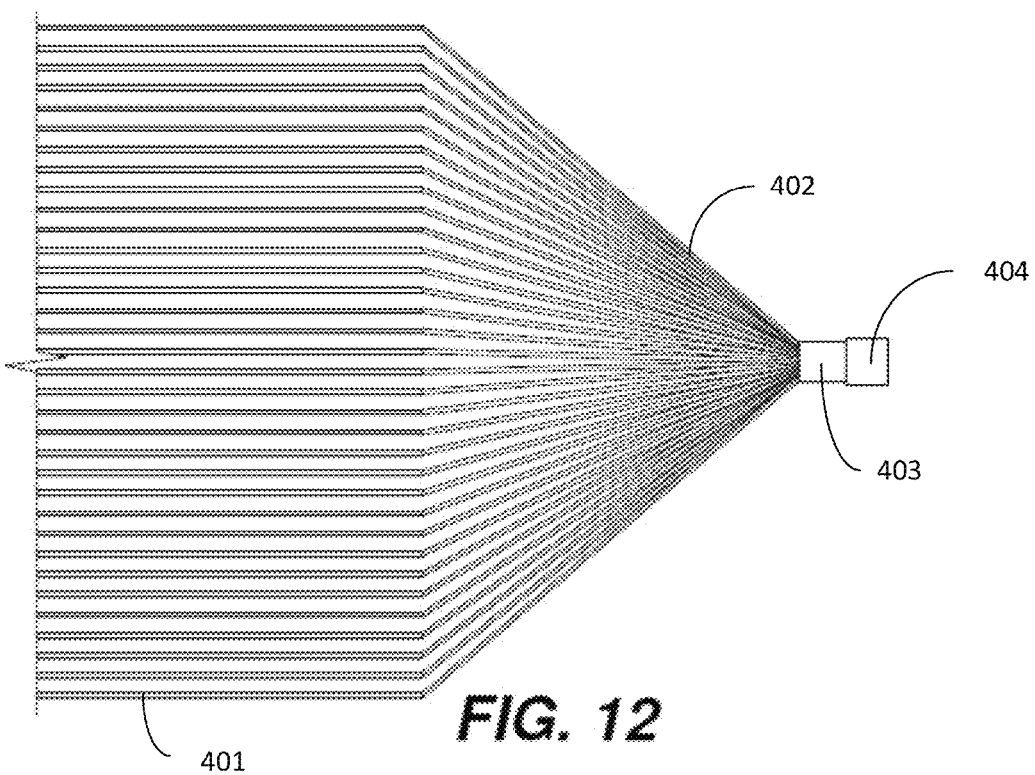
FIG. 12 depicts the same process as in FIG. 11 with a fastening sleeve attached to the optical fiber bundle.

FIGS. 11 and 12 depict stages of a process to create a bundle of optical fiber from loose optical fiber strands 401. In this process, loose optical fiber strands 401 are collected and held together to form a bundle head. This process may be performed manually or by an automatic bundle winding machine. The bundle head may be put into an automatic tape winder, upon which collecting tape 403 is deployed to wrap around the bundle head. The collecting tape 403 protects the optical fiber strands from damage and group the optical fiber strands into a bundle for further processing. The collecting tape 403 may comprise, for example, plastic, composite, or another material selected, for example, for its elasticity and/or electrical insulating properties.

Upon formation of the optical fiber bundle 402, uneven remnants of optical fiber strands may be removed by an automatic fiber bundle remnant removal device similar to a knife, which is automatically deployed after the collecting tape 403 has been wrapped around the fiber bundle head. Removed remnants are discarded. A uniform bundle head without extending strands is necessary for connecting to a light source. In this regard, the bundle head refers to a surface comprised of the plurality of strands adapted to be operably connected with a light emitting assembly 100.

The bundle head can be provided in a variety of formats and shapes, often adapted to the shape of the light source or the space between the light source and the ends of the strands in the bundle in operable connection with the light emitting assembly 100. In frequent embodiments the shape of the bundle head comprised of the plurality of strands is a uniform flat surface. Also often, the shape of the bundle head comprised of the plurality of strands is at least partially spherical, cuboid, pyramidal or cone shaped. Most frequently, the shape of the bundle head is adapted to correspond to the shape or light emission pattern of the light emitting assembly 100 to provide a predefined lighting effect, color, and/or intensity. In certain embodiments the light emitting assembly 100 is provided with one or more prism, mirror, filter, and/or grating between the light source and the bundle head to provide a predefined lighting effect, color, and/or intensity. In certain embodiments, the shape of the bundle head is adapted to correspond to the shape or light emission pattern of the light emitting assembly 100 to provide a predefined lighting effect, color, or intensity and the light emitting assembly 100 is provided with one or more prism, mirror, filter, and/or grating between the light source and the bundle head to provide a predefined lighting effect, color, or intensity.

After the collecting tape 403 has secured the optical fiber bundle 402, an automatic banding machine is used to automatically add a fastening sleeve 404 outside the collecting tape 403. The fastening sleeve 404 may comprise metal, frequently copper or a similar material, for sturdiness and ease of fabrication. The fastening sleeve 404 locks the fiber bundle and forms a standard fiber bundle, which may be used in the light emitting assembly 100 as disclosed herein. Forming a bundle is important in connecting optical fiber strands to a light source. Uniform optical fiber bundles 402 are also important in providing consistent quality in light emitting fabric applications.

In embodiments, a manufacturing assembly to produce optical fiber bundles 402 according to embodiments comprises an automatic bundle winding machine configured to wind a plurality of loose optical fiber strands 401 into bundles. An automatic tape winder is deployed after the automatic bundle winding machine to wind the bundles with collecting tape 403s. An automatic fiber remnant removal device is deployed to remove any uneven optical fiber strand parts. An automatic banding machine is deployed thereafter to add a fastening sleeve 404, which may comprise copper, onto the collecting tape 403.

Operating parameters of the tape winding machine and the automatic banding machine may be set, such that the size of the bundle and fastening sleeve 404 are consistent, thereby enabling consistent light emitting capabilities. These parameters may also be changed to meet different demands for the fiber bundles.

In a first embodiment, an apparatus for conducting light to a fabric surface is provided, the apparatus comprising:
 a light source configured to emit light;
 a light guide physically and operatively connected to the light source;
 at least one optical fiber bundle physically and operatively connected to the light source;
 a circuit board operatively connected to the light source;
 a case to enclose the light source, the light guide, the circuit board and a part of the at least one optical fiber bundle; and
 a sleeve positioned on the outside of the case, the sleeve wraps around the case section covering the optical fiber bundle;
 wherein the light guide is configured to guide the light emitted by the light source towards the at least one optical fiber bundle,
 wherein the light source is connected to the optical fiber bundle at a coupling interface, and
 wherein the at least one optical fiber bundle comprises fiber optic strands configured to conduct light from the light source.

In a second embodiment, the first embodiment includes a case comprising heat shrinkable plastic.

In a third embodiment, the first embodiment includes a case comprising crimp-type metal confinement ring.

In a fourth embodiment, each of the first to third embodiment includes a case enclosing the parts inside in a waterproof manner.

In a fifth embodiment, each of the first to fourth embodiment includes at least one optical fiber bundle slidably connected to the coupling interface in a snap-fit configuration.

In a sixth embodiment, each of the first to fifth embodiment includes at least one optical fiber bundle comprising fiber optic strands configured to light up at the end of the fiber optic strands.

In a seventh embodiment, each of the first to fifth embodiment includes at least one optical fiber bundle comprising fiber optic strands configured to light up along the body of the fiber optic strands.

In an eighth embodiment, each of the first to fifth embodiment includes, at least one optical fiber bundle comprising both fiber optic strands configured to light up at the end of the fiber optic strands and fiber optic strands configured to light up along the body of the fiber optic strands.

In the ninth embodiment, each of the first to eight embodiment includes fiber optic strands, at least part of each of the fiber optic strands are weaved into textile yarn threads to create fiber optic fabric.

In the tenth embodiment, each of the first to ninth embodiment includes at least one additional cable configured to connect the apparatus to a power source.

In the eleventh embodiment, the tenth embodiment includes at least one additional cable connecting the apparatus to another similar apparatus.

In the twelfth embodiment, each of the tenth to eleventh embodiment includes a controller configured to control the lighting of the optic fiber bundle, the controller configured to connect the at least one cable.

In the thirteenth embodiment, the twelfth embodiment includes a controller comprising a circuit board, a microcontroller unit, an on/off button, at least one port, and a case to enclose the above components.

In the fourteenth embodiment, the thirteenth embodiment includes a battery.

In the fifteenth embodiment, the fourteenth embodiment includes a onetime use, replaceable battery.

In the sixteenth embodiment, the fourteenth embodiment includes a rechargeable battery.

In the seventeenth embodiment, each of the twelfth to sixteenth embodiments includes a controller configured to supply up to 700 milliAmp per hour of current.

In the eighteenth embodiment, each of the twelfth to sixteenth embodiments includes a controller configured to automatically power off when not connected to a cable.

In the nineteenth embodiment, the thirteenth embodiment includes at least one port configured to operatively connected to an electrical power cable.

In the twentieth embodiment, the thirteenth embodiment includes at least one port configured to operatively connected to a charging cable.

In the twenty first embodiment, the thirteenth embodiment includes only one port and the only one port is configured to operatively connected to a charging cable as well as an electrical power cable.

In the twenty second embodiment, the twenty first embodiment includes at least one port that is a single multi-function universal Type C charging port.

In the twenty third embodiment, each of the thirteenth to twenty second embodiment includes at least one port adapted to operatively connect with a universal 5 Volt charging cable to charge the controller.

In the twenty fourth embodiment, the ninth embodiment includes fiber optic fabric comprising a part of a clothing garment.

In the twenty fifth embodiment, the ninth embodiment includes fiber optic fabric comprising a part of a curtain.

In the twenty sixth embodiment, the ninth embodiment includes fiber optic fabric comprising a part of a wall covering.

In the twenty seventh embodiment, the ninth embodiment includes fiber optic fabric comprising a part of a furniture covering.

In the twenty eighth embodiment, the ninth embodiment includes fiber optic fabric comprising a part of a vehicle interior covering.

In the twenty ninth embodiments, a method to make a lighted clothing garment is provided, the method comprising:
    providing an apparatus according to relevant claims as above;
    combine the apparatus with other fabric, textile, cloth, or other material suitable for garment production; and
    tailor the combination to produce a garment.

In the thirtieth embodiments, a device for treating fabric is provided, comprising:
    a handle having a hollow structure at one end forming a socket;
    at least one bearing configured to fit into the socket;
    a plurality of blades, each blade having sharp edges and pointy extensions distributed around the rim of the blade, each of the plurality of blades has a circular bore bearing through the thickness of the blade;
    a plurality of blade sleeves, each of the plurality of blade sleeves has a circular bore bearing through the thickness of the blade sleeve; and
    an axle dimensioned to insert through the center of the plurality of blades and the plurality of blade sleeves at the bores, the axle having bores with threads at each end to receive bolts;
    wherein each of the plurality of blade sleeves are placed in between two adjacent blades,
    wherein the circular bore on the each of the plurality of blades and the circular bore on each of the plurality of sleeves are of the same dimensions, and
    wherein the plurality of blades are configured to be able to rotate around the axle.

In the thirty first embodiment, the thirtieth embodiment includes a snap ring positioned between the at least one bearing and the blade closest to the bearing.

In the thirty second embodiment, each of the thirtieth to thirty first embodiments includes a spacer positioned between the bolt and the handle.

In the thirty third embodiment, each of the thirtieth to thirty second embodiments includes a plurality of substantially circular blades and a plurality of substantially circular sleeves.

In the thirty fourth embodiment, each of the thirtieth to thirty third embodiments includes pointy extensions on each of the plurality of blades situated symmetrically around the circular edge of the blade.

In the thirty fifth embodiment, each of the thirtieth to thirty fourth embodiments includes a handle dimensioned for grasping by a human hand.

In the thirty sixth embodiment, each of the thirtieth to thirty fifth embodiments includes an aperture at the end of the handle without the head.

In the thirty seventh embodiment, the thirty sixth embodiment includes an aperture configured for hanging of the device in storage.

In the thirty eighth embodiment, a method to prepare lighted pattern on a fiber optic fabric is provided, the method comprising:
    providing a device according to any of the thirtieth to thirty seventh embodiment;
    providing a piece of fiber optic fabric;
    placing the blades of the device onto the surface of the fiber optic fabric; and
    grasping the handle and pushing the handle such that the blades roll on the fabric.

In a thirty ninth embodiment, a method to prepare an optical fiber bundle is provided, the method comprising:
    providing a plurality of optical fiber strands;
    collecting the plurality of optical fiber strands at one end and holding them to form a bundle head;
    wrapping the bundle head with collecting tape;
    cutting and discarding the remnants of the bundle head; and
    adding a fastening sleeve outside the collecting tape.

In a fortieth embodiment, the thirty ninth embodiment includes a plurality of optical fiber strands extending from a fabric piece, the plurality of the optical fiber strands forming part of the fabric piece.

In a forty first embodiment, each of the thirty ninth to fortieth embodiments includes collecting tape comprising plastic.

In a forty second embodiment, each of the thirty ninth to forty first embodiments includes fastening sleeve comprising copper.

In a forty third embodiment, each of the thirty ninth to forty second embodiments includes collecting and holding of the optical fiber strands being performed by an automatic bundle winding machine.

In a forty fourth embodiment, each of the thirty ninth to forty third embodiments includes wrapping the bundle head with a collecting tape being performed by an automatic tape winder.

In a forty fifth embodiment, each of the thirty ninth to forty fourth embodiments includes cutting and discarding the remnants of the bundle head being performed by an automatic fiber bundle remnant removal device.

In a forty sixth embodiment, each of the thirty ninth to forty fifth embodiments includes adding a fastening sleeve outside the collecting tape being performed by an automatic banding machine.

In a forty seventh embodiments, a manufacturing assembly to produce optical fiber bundles is provided, comprising:
    an automatic bundle winding machine configured to collect and wind a plurality of fiber strands to form a bundle;

an automatic tape winder configured to wrap tape around the bundle;

an automatic fiber bundle remnant removal device configured to remove and discard part of fiber strands; and an automatic banding machine configured to add a sleeve outside the tape wrapped around the bundle.

Other features and advantages of the invention will be apparent from the following detailed description, and from the claims.

The above examples are included for illustrative purposes only and are not intended to limit the scope of the invention. Many variations to those described above are possible. Since modifications and variations to the examples described above will be apparent to those of skill in this art, it is intended that this invention be limited only by the scope of the appended claims.

We claim:

1. An apparatus for conducting light to a fabric surface, the apparatus comprising:
    a light source configured to emit light;
    a light guide physically and operatively connected to the light source;
    at least one optical fiber bundle physically and operatively connected to the light source;
    a circuit board operatively connected to the light source;
    a case to enclose the light source, the light guide, the circuit board and a part of the at least one optical fiber bundle; and
    a sleeve positioned on the outside of the case, the sleeve wraps around the case section covering the optical fiber bundle;
    wherein the light guide is configured to guide the light emitted by the light source towards the at least one optical fiber bundle,
    wherein the light source is connected to the optical fiber bundle at a coupling interface, and
    wherein the at least one optical fiber bundle comprises fiber optic strands configured to conduct light from the light source.

2. The apparatus of claim 1, wherein the case encloses the parts inside in a waterproof manner.

3. The apparatus of claim 1, wherein the at least one optical fiber bundle is slidably connected to the coupling interface in a snap-fit configuration.

4. The apparatus of claim 1, wherein the at least one optical fiber bundle comprises fiber optic strands configured to light up at the end of the fiber optic strands or to light up along the body of the fiber optic strands.

5. The apparatus of claim 1, wherein at least part of each of the fiber optic strands are weaved into textile yarn threads to create fiber optic fabric.

6. The apparatus of claim 1, further comprising at least one cable configured to connect the apparatus to a power source and at least one additional cable configured to connect the apparatus to another similar apparatus.

7. The apparatus of claim 6, further comprising a controller configured to control the lighting of the optic fiber bundle, the controller configured to connect the at least one cable and comprises a circuit board, a microcontroller unit, an on/off button, at least one port, and a case to enclose the above components.

8. The apparatus of claim 7, further comprising a battery.

9. The apparatus of claim 7, wherein the controller is configured to automatically power off when not connected to a cable.

10. The apparatus of claim 7, wherein the at least one port is configured to operatively connected to an electrical power cable or a charging cable.

11. The apparatus of claim 7, wherein the at least one port is a single multi-function universal Type C charging port.

12. The apparatus of claim 5, wherein the fiber optic fabric comprises a part of a clothing garment, a part of a curtain, a part of a wall covering, a part of a furniture covering, or a part of a vehicle interior covering.

13. A device for treating fabric, comprising:
    a handle having a hollow structure at one end forming a socket;
    at least one bearing configured to fit into the socket;
    a plurality of blades, each blade having sharp edges and pointy extensions distributed around the rim of the blade, each of the plurality of blades has a circular bore bearing through the thickness of the blade;
    a plurality of blade sleeves, each of the plurality of blade sleeves has a circular bore bearing through the thickness of the blade sleeve;
    an axle dimensioned to insert through the center of the plurality of blades and the plurality of blade sleeves at the bores, the axle having bores with threads at each end to receive bolts; and
    a snap ring positioned between the at least one bearing and the blade closest to the bearing and a spacer positioned between the bolt and the handle,
    wherein each of the plurality of blade sleeves are placed in between two adjacent blades,
    wherein the circular bore on the each of the plurality of blades and the circular bore on each of the plurality of sleeves are of the same dimensions, and
    wherein the plurality of blades are configured to be able to rotate around the axle.

14. The device of claim 13, wherein the plurality of blades and the plurality of sleeves are substantially circular and wherein the pointy extensions on each of the plurality of blades are situated symmetrically around the circular edge of the blade.

15. A method to prepare an optical fiber bundle, the method comprising:
    providing a plurality of optical fiber strands;
    collecting the plurality of optical fiber strands at one end and holding them to form a bundle head;
    wrapping the bundle head with collecting tape;
    cutting and discarding the remnants of the bundle head; and
    adding a fastening sleeve outside the collecting tape,
    wherein the collecting and holding of the optical fiber strands are performed by an automatic bundle winding machine,
    wherein wrapping the bundle head with a collecting tape is performed by an automatic tape winder,
    wherein cutting and discarding the remnants of the bundle head is performed by an automatic fiber bundle remnant removal device, and
    wherein adding a fastening sleeve outside the collecting tape is performed by an automatic banding machine.

16. The method of claim 15, wherein the plurality of optical fiber strands extend from a fabric piece, the plurality of the optical fiber strands forming part of the fabric piece.

17. The method of claim 15, wherein the collecting tape comprises plastic and the fastening sleeve comprises copper.

18. A manufacturing assembly to produce optical fiber bundles, comprising:

an automatic bundle winding machine configured to collect and wind a plurality of fiber strands to form a bundle;

an automatic tape winder configured to wrap tape around the bundle;

an automatic fiber bundle remnant removal device configured to remove and discard part of fiber strands; and an automatic banding machine configured to add a sleeve outside the tape wrapped around the bundle.

\* \* \* \* \*